United States Patent [19]

Kagami et al.

[11] Patent Number: 5,532,844
[45] Date of Patent: Jul. 2, 1996

[54] IMAGE DATA TRANSFERRING SYSTEM AND METHOD

[75] Inventors: Yuichi Kagami; Takashi Kanda, both of Kofu, Japan

[73] Assignee: Nisca Corporation, Yamanashi-ken, Japan

[21] Appl. No.: 283,214

[22] Filed: Jul. 29, 1994

[30] Foreign Application Priority Data

Jul. 30, 1993 [JP] Japan .................................. 5-208516

[51] Int. Cl.⁶ .............................. H04N 1/32; H01J 3/00
[52] U.S. Cl. .................... 358/468; 358/442; 358/444; 364/238.2; 364/238.3; 395/821
[58] Field of Search ................................ 358/468, 462, 358/442, 408, 444; 364/238.2, 238.3; 395/275

[56] References Cited

U.S. PATENT DOCUMENTS 3,879,713  4/1975  Bettin .................................. 340/172.5
4,297,727  10/1981  Ogawa .................................. 358/261

Primary Examiner—Edward L. Coles, Sr.
Assistant Examiner—Tia S. N. Harris
Attorney, Agent, or Firm—Kane, Dalsimer, Sullivan, Kurucz, Levy, Eisele and Richard

[57] ABSTRACT

An image data transferring system interfaces an image processor and an image scanner by utilization of signal input and output ports of a common printer connector mounted on the image processor without using a specific dedicated interface to rationally transfer a multiple-bit image data signal from the image scanner. The image processor and said image scanner can share the signal input and output ports by classifying said ports into an output port block for feeding out a command signal from the image processor, an image data input port block for transferring the image data signal from the image scanner, and a control port block for issuing a control signal to be given to the image scanner. The effective transfer ports can be recognized by comparing a check signal to be given to the image scanner and its echo signal sent back from the image scanner.

13 Claims, 9 Drawing Sheets

IMAGE DATA TRANSFERRING SYSTEM AND METHOD

BACKGROUND OF THE INVENTION

1. Field of the Invention

This invention relates to an image data transferring system and method for interfacing an image scanner and an image processor such as a personal computer, and more particularly to a system and method capable of rationally transferring image data read out from the image scanner to the image processor and command and control signals from the image processor to the image scanner by utilizing input-output lines of a general interface so as to fundamentally transfer various signals such as image data signals, status signals and other control signals between the image processor and the image scanner, without using a specific dedicated interface.

2. Description of the Prior Art

Image processing systems are being rationalized day by day as image processing techniques are improved. In particular, the image scanner has been decreased in size and weight while significantly heightening its performance. An image processor or image processing computer as well as the image scanner has evolved from a large-scale system to a high performance, small-scale system while markedly improving its performance.

In spite of the marked advance of the image processing computer and image scanner, data transferring systems for interfacing or linking the image processing computer and image scanner and the control means for controlling the data transferring system make scarcely any changes. To be specific, there has been so far used a dedicated signal transferring system or interface system for transferring the image data signals and the control and command signals between the image scanner and the image processing computer.

In general, as signal transferring or interfacing means, there are various interfaces such as an RS-232-C interface and GP-IB (general purpose interface bus) interface for linking the image scanner and the host image processing computer, a parallel interface such as SCSI, and a peculiar interface for the exclusive use of a flexible disk or floppy disk drive unit.

Since the RS-232-C interface mounted on the general purpose computer as a standard serial interface facilitates software description for controlling the input and output operation thereof, it can be easily handled, but suffers from the defect that information data is transferred at some-thousands of bits per second at most even if the transfer rate is set to the maximum. Therefore, in the case of the transfer of colossal image data necessary for reproducing a full color image composed of dots each depicted by either one of eight colors, the very slow transfer rate of the RS-232-C interface is disadvantageous for image processing.

Although the GP-IB interface has an advantage in that this interface make it possible to transfer information data between hardwares at a high speed, it requires software for exclusive use of input-output routines and complicated hardware such as an interface board to be set into the host computer, suggesting that it is not fit for a portable computer such as a stand-alone small-sized computer or a so-called note-type personal computer.

Other peculiar exclusive interfaces capable of being possibly miniaturized suffer from operational inefficiency in both software and hardware and lacking in versatility and practicability.

Attempts are now being made to use a bidirectional interface for bidirectionally transferring information data between the image processing computer and image scanner, but does not meet the needs for simplification of the hardware.

As a possible way of transferring signals between the image scanner and computer, there is proposed a system utilizing a Centronics interface commonly mounted in the computer for outputting printer data and control signals from the host computer to the printer in Japanese Patent Application Public Disclosure No. HEI 5-6238(A). The Centronics interface is widely applied to general purpose computers as a standard interface and has a function of transferring data in parallel between the computer and printer at a high speed.

To be more specific, the Centronics interface mounted in the host computer is provided with data output lines for forwarding data signals and control signals from the host computer to the printer, and handshake lines for feeding status signals representing the status of the printer to the host computer. This proposed system utilizes the handshake lines of the Centronics interface to transfer image data signals from the image scanner to the host computer, thereby materializing high-speed data transfer and miniaturization of the interface system.

Incidentally, the Centronics connector or interface boards with input-output ports are classified into some types having no compatibility according to the number of connector pins of, typically, Centronics interface boards of 36 pins, 25 pins, 24 pins and 14 pins. In addition, there is known a half-pitch Centronics connector of compact size for use in a portable computer. The connector pins in the connector board do not correspond to those in the different type Centronics interface boards in designation of signals to be transferred.

For instance, the 36-pin type Centronics connector has eight data lines [D0~D7] for outputting 8-bit data, handshake lines consisting of #1 port [STB (strobe)] correlating with the data ports and #10 port [ACK (acknowledge)], and message lines consisting of #11 [BUSY], #12 port [PE (paper end)], #13 port [SLCT (select)], #31 port [INIT (initialize)], #32 port [ERROR] and #36 port [SI (select-in)]. Since the ports of the handshake and message lines can transfer the signals from the printer to the host computer, it is possible to transfer a multiple-bit image data signal outputted from the image scanner to the image processing computer through these handshake and message lines. However, the handshake and message lines in the 25-pin Centronics connector consist of only five ports of ACK, BUSY, PE, SLCT and ERROR ports. Thus, an image scanner provided with the 36-pin type Centronics connector entailed a disadvantage such that it cannot be applied to the 25-pin or 14-pin type Centronics interface.

In general, a Centronics connector cable for a printer is made by bundling a number of wires, turning out to be large in volume and bulky to carry about together with a portable computer or image scanner. Besides, since the conventional connector cable of this type is short of flexibility, it is unsuitable for a self-propelling type portable image scanner capable of moving along the surface of a document by itself because it is hindered by the stiff connector cable when moving on the document to scan an image on the document, resulting in failure to scan the image.

OBJECT OF THE INVENTION

This invention is made to eliminate the drawbacks suffered by the conventional image data transferring systems as described above and has an object to provide a simple and convenient system capable of rationally transferring image data and control or command signals between an image processing computer and an image scanner by use of a general interface connector mounted commonly on an image processor such as a general purpose personal computer without use of a dedicated interface.

Another object of this invention is to provide an image data transferring system capable of transferring image data signals from the image scanner to the image processor at a high speed by using a parallel interface connector such as a standard Centronics interface which is generally mounted on a common personal computer for outputting information and control data to a printer.

Still another object of this invention is to provide an image data transferring system capable of automatically recognizing the number of effective ports of the signal transfer lines of a parallel interface applied for image data transfer so as to automatically coordinate a variety of interface connectors having different types of input/output ports.

Yet another object of this invention is to provide an image data transferring system capable of materializing miniaturization of the total system inclusive of a portable image scanner by use of a general interface connector of a common personal computer.

A further object of this invention is to provide an image data transferring system capable of decreasing the number of signal transfer lines of an interface connecting cable while increasing the transfer rate and improving the portability and operability of the system.

SUMMARY OF THE INVENTION

To attain the object described above according to this invention, there is provided a system for interfacing an image processor having signal input and output ports and an image scanner to transfer image data issued from the image scanner and control or command signals outputted from the image processor, comprising signal transfer lines for transferring in parallel the control or command signals from the image processor to the image scanner and the image data signal from the image scanner to the image processor, and an interface unit including switching means for selectively switching the signal input and output ports of the image processor to either the signal input ports when transferring the image data from the image scanner to the image processor or the signal output ports when transferring the control or command signals from the image processor to the image scanner.

As the signal input and output ports of the image processor, input-output ports of a Centronics connector generally mounted on a common personal computer for outputting a multiple-bit image data signal to a printer are used. By classifying the signal input and output ports into a setting-signal output port block, an image data input port block, and management data output port block, the data bits of the image data signal issued from the image scanner can be transferred to the image processor in parallel at a high speed under the control of the image processor through the input-output ports for commonly giving the data signals to a printer.

The image scanner and the interface unit are detachably connected to each other through the Centronics connector having a connector cable with a required number of transfer lines which is at least equal to the total number of the data and control and command signals to be transferred.

The interface unit may be integrated with or separated from the image scanner. The interface unit separated from the image scanner may accommodate an AC/DC adapter and connected to the image scanner through the connector cable to supply an electric power to the image scanner.

Each transfer line is made up of a pair of input and output ports of the image processor so as to select either input port or output port by operating the switching means. Thus, since the transfer lines connecting between the image processor and the image scanner are sharable for transferring input and output signals, the number of transfer lines can be decreased.

Availability of the input and output ports of the interface connector of the image processor can be recognized by delivering a check signal from the image processor to the interface unit and sending back an echo signal from the interface unit to the image processor to compare the original check signal issued from the image processor with the echo signal sent back from the interface unit. A discrimination means for designating available ports of the interface connector upon reception of a resultant indicating signal issued from the image processor as the result of comparing the check signal and echo signal may be disposed in the interface unit. The interface unit with the discrimination means makes it possible to automatically transfer the image data, and control or command signals in accordance with the type of the interface board attached into the image processor.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

The present invention will become more fully understood from the detailed description given hereinbelow and the accompanying drawings which are given by way of illustration only, and thus are not limitative of the present invention.

Figure 1:
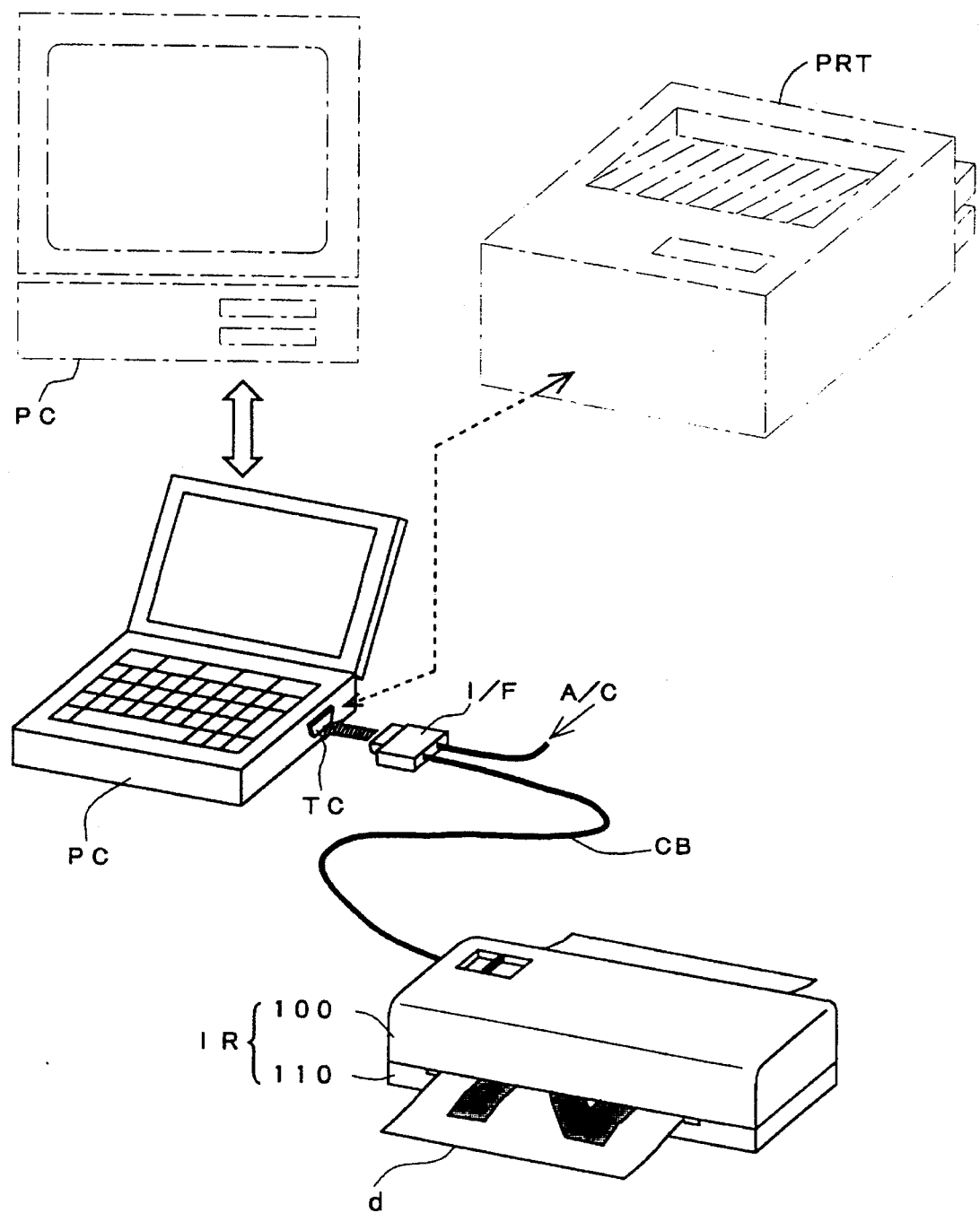
FIG. 1 is a conceptual view showing a structure of the image data transferring system of the present invention.

The image data transferring system of the present invention can rationally interface an image scanner or image reader and an image processor such as a general purpose personal computer to transfer various signals therebetween by use of signal input-output ports of a standard Centronics connector mounted commonly on the personal computer. As illustrated in FIG. 1 showing one example of the system of this invention, through an interface unit (I/F), a signal input-output connector TC of the general purpose computer PC serving as the image processor is connected to the image scanner (IR).

Although a portable computer such as a so called note-type personal computer is used for image processing as the host computer PC in this embodiment, this is by no means limitative and may of course be of any type. Also, the Centronics connector is used as the signal input-output connector in this embodiment, but should not be understood as limitative.

Figure 2:
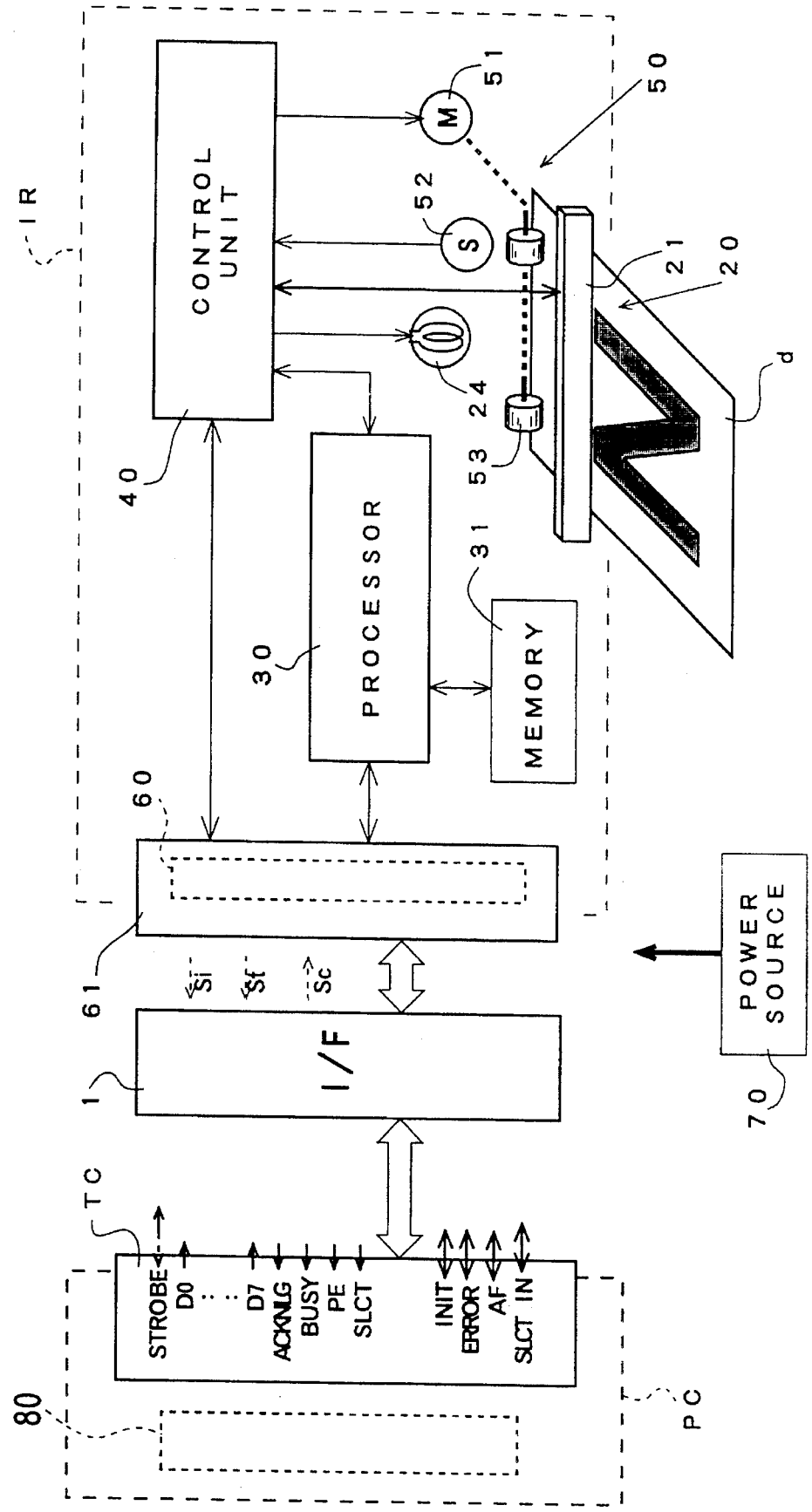
FIG. 2 is a schematic block diagram of the system of this invention.

As shown in FIG. 2, the Centronics connector TC mounted on the computer fundamentally serves as an interface relative to a printer PRT (as shown in FIG. 1 and generally has data output lines D0–D7 assigned for outputting 8-bit data, handshake lines consisting of #1 port [STB (strobe)] correlating with the data ports, and #10 port [ACK (acknowledge)], and message lines consisting of #11 [BUSY], #12 port [PE (paper end)], #13 port [SLCT (select)], #31 port [INIT (initialize)], #32 port [ERROR], and #36 port [SI (select-in)]. Originally, printing information data outputted from the computer are fed to the printer through the data output lines, and status signals from the printer are fed to the computer through the aforementioned handshake and message lines.

In the image data transferring system of this invention, a multiple-bit image data signal representing an image, pattern or character to be finally reproduced and a status signal representing the status of an external device (image reader or image scanner IR in this embodiment) are transferred to the computer by selectively using the handshake and message lines.

The image scanner IR applied to this embodiment is schematically shown in the form of a block circuit in FIG. 2. The image scanner IR comprises an image reading unit 20 having an image sensor 21 such as a CCD sensor for scanning an image on a given document d and outputting the image data signal, an image processing circuit 30 in which the image data signal fed from the image sensor 21 is stored in designated addresses in a memory unit 31, and a control unit 40 having a driving unit 50 having a motor 51 for moving the image sensor 21 relative to the document d and/or a document sensor 52 for detecting the existence and location of the document d.

When reading out the image on the document by the image scanner IR, upon reception of a reading instruction signal (command signal Sc) given by the computer PC, the image scanner starts the image reading while synchronously actuating the driving unit 51. At the time that the image sensor 21 delivers the image data signal Si read out from the image on the document to the memory unit 31, the bit data constituting the image data signal Si are temporarily stored in the designated addresses in the memory unit 31 and then read out from the memory unit 31 to the host computer PC through the I/F unit 1 and the ports of the aforesaid handshake and message lines of the computer PC.

The image processing circuit 30, control unit 40 and status register 43 are connected to the computer PC via an interface control circuit 60.

In the drawing, reference numeral 70 denotes a power unit for supplying an electric power to the image scanner IR, and 80 denotes a control means programmed in the computer PC. This control means 80 includes a series of controlling algorithms for transferring the image data issued from the image scanner to the host computer. The control means 80 may be supplied in the form of a program written in a floppy disk or the like and accompanied with the image scanner.

The illustrated system has a structure of directly connecting the interface unit 1 to the printer connector TC mounted on the computer PC, which calls for onerous work of replacing the interface unit 1 with a printer connector upon completion of the image reading operation. However, by providing the host computer PC with a pair of Centronics connectors of the same type which can be arbitrarily switched by software or hardware, both the printer and image scanner can be stationarily connected concurrently to the host computer PC.

Figure 3:
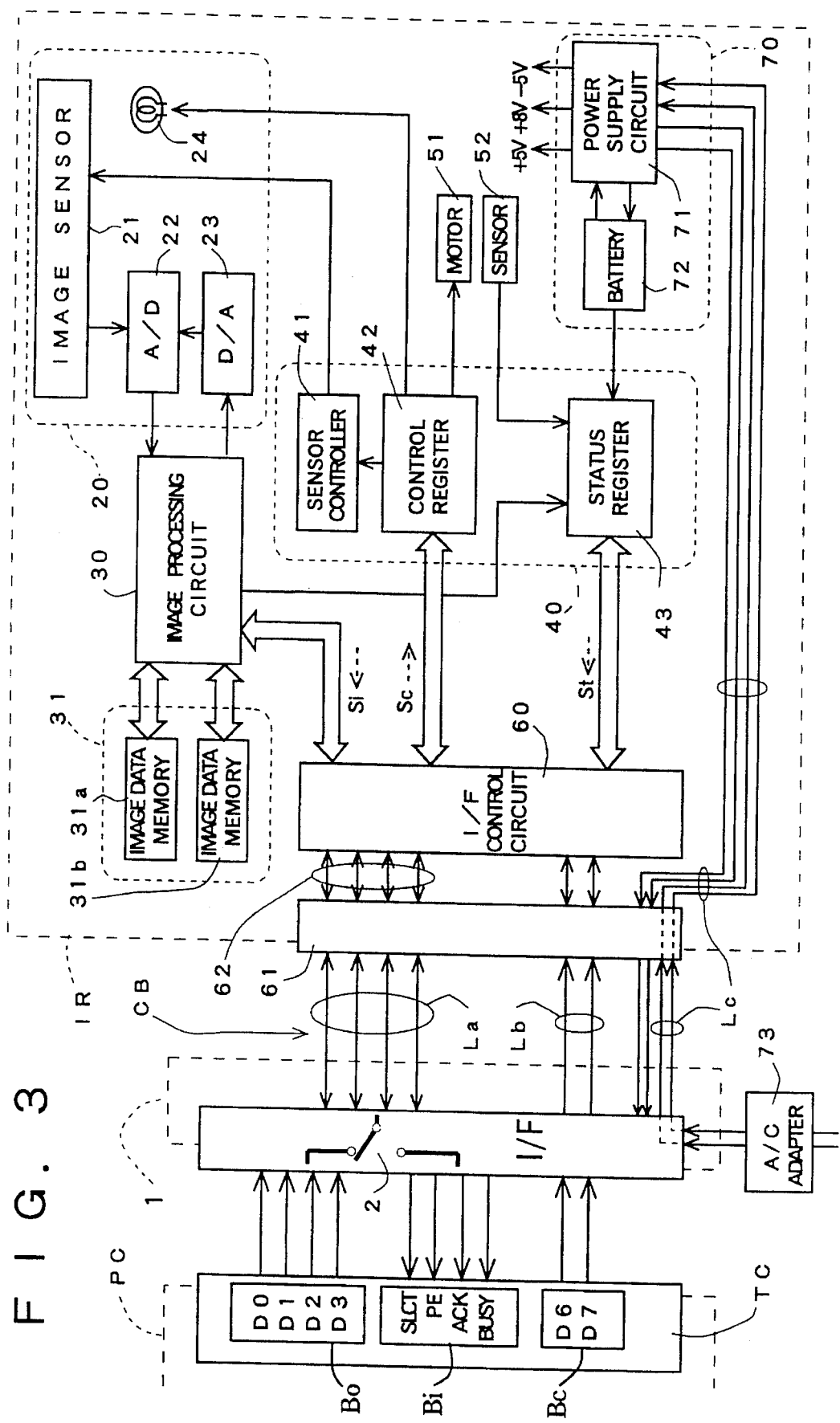
FIG. 3 is a block diagram of one preferred embodiment of this invention.

FIG. 3 shows the first embodiment of the system of this invention in which the image data signal Si obtained by the image scanner IR is sent out by 4 bits in parallel to the host computer PC by use of four ports of BUSY, ACK, PE and SLCT of the 25-pin Centronics connector mounted on the computer PC.

To be more specific, the image reading unit 20 of the image scanner IR of this embodiment further comprises an analog-to-digital converter (A/D) 22 for converting analog signals issued from the image sensor 21 to digital signals, and a digital-to-analog converter (D/A) 23 for converting the image data signal having intensity exceeding the upper or lower limits set in the A/D converter 22 to an analog signal to effect shading compensation. The image reading unit 20 includes a light source 24 such as an LED which is controlled by the control unit 40 to illuminate the document d.

The memory unit 31 linked to the image processing circuit 30 comprises twin arbitrarily accessible memories 31a and 31b such as random access memories (RAM), so that the image data stored in one of the twin memories 31a and 31b is read at the time that the image data fed from the image sensor 21 is written in the other memory 31a or 31b. Thus, the twin memories 31a and 31b make it possible to write and read the image data at a high speed.

Furthermore, by storing the image data in the twin memories 31a and 31b, the image processing circuit 30 can effect various image improvement processing such as shading compensation, image enlargement and reduction processing by interpolation and thinning-out, image enhancement, halftone treatment, quantization, and expansion and contraction processing. Since it is possible to practice these image improvement processing by software, the image scanner need not absolutely possess a function of such image improvement processing.

The control unit 40 comprises a sensor controller 41 for producing a sensor controlling signal for controlling the operation of the image sensor 21, a control register 42 in which various parameters for controlling the component elements of the image scanner as noted above are set, and a status register 43 for sequentially memorizing the status of the image scanner.

The parameters set in the control register 42 can be optionally changed by manipulating the host computer PC so as to execute the designated image improvement processing in the image processing circuit 30 while controlling the motor 51 and sensor controller 41 in accordance with the operating state of the image sensor 21.

The status register 43 collects the status signals St representing the parameters set in the image processing circuit 30, the information of the given document detected by the sensor 52, the conditions of the component elements of the scanner and the conditions of the power unit 70, so that the entire conditions can be perceived on the computer PC or image scanner IR.

The image data signal Si issued from the image processing circuit and the status signal St from the status register 42 are forwarded to the host computer PC by 4 bits in parallel through the I/F control circuit 60, the I/F unit 1 and four signal lines La connected to BUSY, ACK, PE and SLCT ports of the Centronics connector mounted on the computer PC.

When the image data signal Si and status signal St are each composed of 8 bits (one byte), each signal is split into upper 4 bits and lower 4 bits to be transferred sequentially. The status signals St are transferred to the computer PC in the intervals of the transfer of the image data signals sequentially fed to the computer PC under the control of the computer PC.

The computer PC supplies the image scanner IR with the command signal Sc including an addressing signal necessary for writing and reading image data relative to the memory 31, data for shading compensation, and parameter data to be set in the control register 42. The command signal Sc is sent out through the data output ports D0~D3 (transfer line La) and management data ports D6 and D7 (transfer line Lb). The ports D6 and D7 are used for not only outputting the management or control signal but also inputting the status data signal from the image scanner.

That is to say, the input-output ports of a standard Centronics connector generally mounted on the personal computer are classified into a setting-signal output port block Bo (D0~D3 ports), an image data input port block Bi (BUSY, ACK, PE and SLCT ports), and a control port block Bc (D6 and D7 ports) for switching the port blocks Bo and Bi.

To fulfill the transfer of input and output signals by using only the 4-bit or standard 8-bit transfer line La, the I/F ports are switched by operating the I/F control circuit 60 to specify the relevant signal ports and manipulating switching means 2 of the I/F unit 1. Thus, the number of the signal transfer ports can be reduced to the minimum. To put it concretely, the connector cable CB connecting the computer PC and the image scanner IR can be made thin and light in weight to a fraction to some-tenths of a conventional Centronics connector cable.

Internal data bus 62 connecting the I/F control circuit 60 to the connector 61 generally consists of line leads of 8 bits. Therefore, the transfer line La may be formed of not only 4-bit leads but also 8-bit leads.

The power unit 70 comprises a power supply circuit 71 and a rechargeable battery 72. An alternating current supplied from an external AC power source (A/C adapter) 73 is converted to direct currents of +5 V, +8 V and −5 V and fed to the rechargeable battery 72 and other component elements of the image scanner. The power unit 70 is supplied with the electric current through a power input line Lc connected to the I/F unit 70.

As is understood from the foregoing description, to sum up, the system of this invention is featured by using some of the control signal output lines extended outward from the Centronics connector mounted on the computer PC, and the image data transfer lines for inputting the status signal from the image scanner to the computer, so that the control or command signal and image data signal can be transferred between the computer and the image scanner at a high speed without using the dedicated interface for handling the image data. Furthermore, the system of this invention has an outstanding advantage in that, since the signal transfer lines of the Centronics connector can be used as common lines for transferring the command and image data signals between the computer and the image scanner, the signal transfer lines can be made more rational and automatically distinguished in accordance with the purpose of giving the control or command signal from the computer to the image scanner or transferring the image data signal from the image scanner to the host computer.

The operating principle of controlling the image data transferring system of this invention will be described hereinafter with reference to FIG. 4 through FIG. 6.

In general, the image data signal Si issued from the image processing circuit 30 to the computer PC, the command signal Sc given from the computer PC to the control register 42, and the status signal St from the status register 43 to the computer PC each consist of 8 bits (one byte).

The image data signal Si and status signal St are fed to the port block Bi of BUSY, ACK, PE and SLCT ports of the Centronics connector of the computer PC through the four-lead transfer line La. The control or command signal Sc is fed from the computer PC to the control register 42 through the port block Bo of D0–D3 ports and the transfer line La. Therefore, the transfer line La is selectively used by switching the switching means 2 of the I/F unit 1 in accordance with the case in which the status signal St is fed via the port block Bi or the command signal Sc is fed via the port block Bo. Thus, the output and input signals can be effectively fed to the computer PC by 4 bits in parallel through the transfer line La.

First, the host computer PC is operated to determine a command output mode or an image data input mode and issue a mode signal from the ports D6 and D7 to the I/F control circuit 60 through the line Lb.

In the case of the command output mode in which the command signal Sc is fed out from the computer PC, selection of operating either the control register 42 or the image processing circuit 30 for effecting shading compensation is made while outputting the command signal of 4 bits for selecting the output address in the control register 42 to the I/F control circuit 60 via the ports of D0–D3, I/F unit 1 and line La, thus determining the address for storing the image data in the register on the basis of the command signal Sc.

At the time that the computer PC deals with neither image data input nor command output, the status signal St representing the status of the image scanner IR is given from the status register 43 to the computer PC. The status register 43 has a function of monitoring the operating condition of the image scanner IR and operates to appraise the availability of the sensor 52 and memory 31 each time a scanning line prescribed imaginarily on the given document is updated during image scanning operation for reading the image on the document. Thus, when the image reading is regarded as valid by the status register 43, the image reading operation is continued. The timing signal for inputting and outputting the data signal in the status register 43 is given by the computer PC through the ports D0–D3 and the transfer line La. That is to say, the output address signal of 4 bits is fed from the computer PC to the I/F control circuit 60 through the ports D0–D3 and line La, consequently to designate the specific address or addresses in the status register 43 under the control of the I/F control circuit 60, and in return, the status signal St stored at the designated address or addresses in the status register 43 is fed to the computer PC through the line La.

Also, the image data signal Si from the image processing circuit 30 including the image data memories is fed in the manner substantially identical to that in the status register 43 as described above. That is, the computer PC is operated to designate the address or addresses in the image processing circuit 30, so that the image data signal Si is read out from one of the image data memories 31a and 31b and forwarded to the computer PC through the line La.

The command signal Sc is usually given to the control register 42 when initializing the image scanner IR.

The control elements of the image processing circuit 30, control register 42 and status register 43 each are triggered by a signal having a specific potential level which is given from the computer PC through the ports D6 and D7. Namely, when the potential level of the signal outputted from the port D6 becomes low "L", a "write mode" is specified in the control system, and when the potential level of the signal from the port D7 becomes low "L", a "read mode" is specified.

Figure 4:
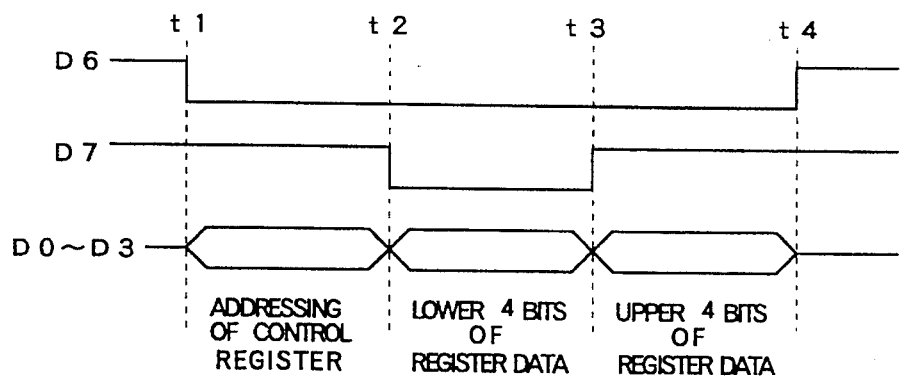
FIG. 4 is a timing chart showing the manner of writing image data to a control register in the system of this invention.

The timing of writing the control signal in the control register 42 is depicted in FIG. 4. In the illustrated case specifying the "write mode" in which the command signal is given from the computer PC to the control register 42, the port D6 assumes a low level "L" at t1, and then, designating writing addresses to be given to the control register 42 are issued to the line La consisting of four leads in the period t1–t2. Next, when the potential level of the port D7 becomes low "L" at t2, the lower 4 bits of the 8-bit command signal Sc from the computer PC is first written at the designated addresses in the control register 42, and successively, the level of D7 becomes high "H", thus writing the upper 4 bits of the command signal Sc at the other designated addresses in the control register 42.

Figure 5:
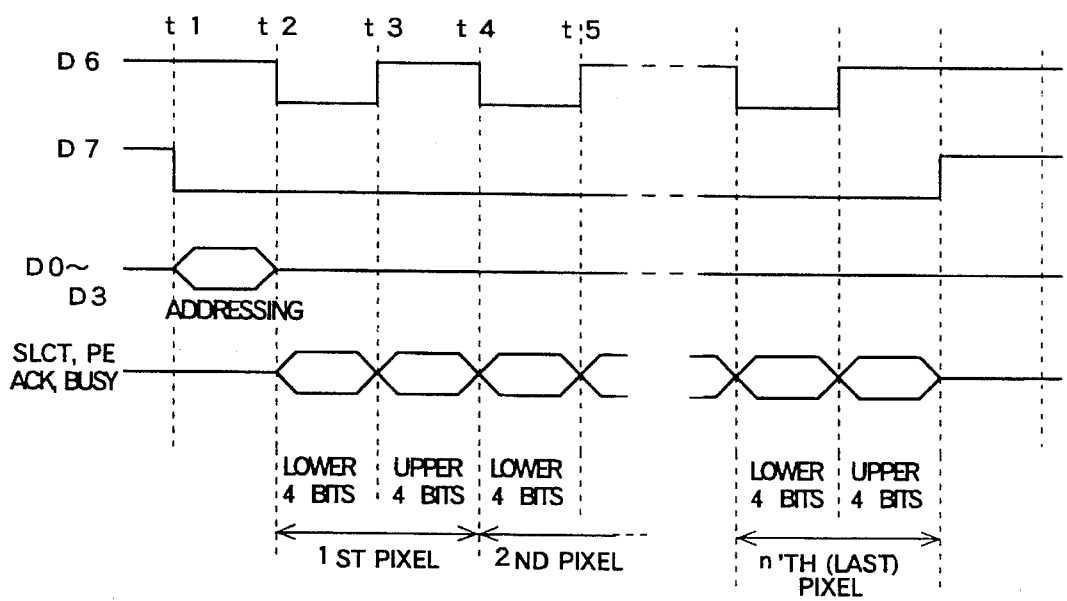
FIG. 5 is a timing chart showing the manner of transferring the image data stored in memories to a host computer.

FIG. 5 shows the timing of reading out the image data signal stored in one of the image data memories 31a and 31b and forwarding to the computer PC through the 4-bit transfer line La. In this embodiment in the "read mode", the potential level of D7 is low "L" at t1, and then, the reading addresses for the image data memory 31a or 31b are fed to the image processing circuit 30 through the line La consisting of four leads. Next, when the port D6 assumes a low level "L" at t2, the lower 4 bits of the image data signal consisting of 8 bits representing a first pixel on the image of the given document are read out and forwarded to the computer PC through the line La. And successively, the potential level of the port D6 becomes high "H" at t3, thus reading out the upper 4 bits of the image data signal to the computer PC through the line La. When the port D6 again assumes a low level "L" at t4, the lower 4 bits of the image data signal of a second pixel on the given image are read out and forwarded to the computer PC through the line La. After this, the same operation is repeated in much the same way as that for the first pixel of the given image until the potential level of the port D7 becomes high "H" after the upper 4 bits of the last pixel (n'th pixel) are read out.

Figure 6:
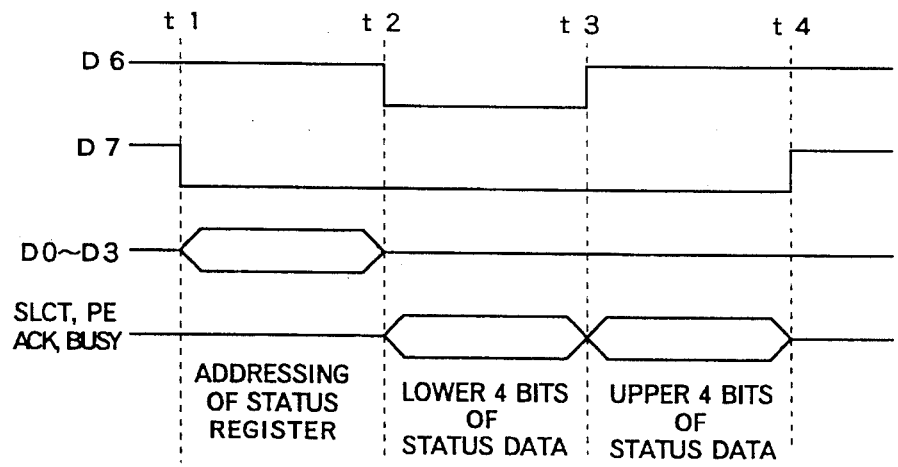
FIG. 6 is a timing chart showing the manner of reading out and outputting a status signal from an image scanner to the host computer.

The timing chart bits of FIG. 6 shows the operation of forwarding to the computer PC the status signal St indicating the conditions bits of the status register 43. In the "read mode" in which the status signal is forwarded to the computer PC, the potential level of the port D7 becomes low "L" at t1, thus giving the reading addresses in the status register 43 to the image control circuit 30 through the four-lead line La in the period bits of t1–t2. Next, the port D6 becomes low "L" in potential level at t2, so that the lower 4 bits of the 8-bit status signal St representing various conditions of the image scanner are first fed to the computer PC through the line La, and successively, the upper 4 bits of the status signal St are fed to the computer PC through the line La when the port D6 assumes a high level "H". Consequently, the status of the image scanner can be recognized by the computer PC or displayed on a display. In accordance with the status of the image scanner thus recognized, a warning and so on may be issued.

As noted above, according to this invention, a parallel interface connector TC which has been so far used for outputting printing data from a host computer to a printer can be used for transferring image data and control or command signals between the host computer and the image scanner without an ineffective image data transferring system such as a RS-232-C serial interface or any other dedicated interface. The image data transferring system bits of this invention makes it possible to transfer the image data and control or command signals at a high speed and facilitates the connection between the image scanner and the image processing computer, and advantageously, it can be controlled by software set on the side of the host computer. It is convenient to attach the interface system of this invention to a small-size computer such as a note-type personal computer which does not essentially accept a built-in type interface board.

Moreover, since the image data transferring system of the invention classifies the data interface ports bits of the standard Centronics connector mounted on the host computer into the setting-signal output port block Bo (D0 to D3 ports), the image data input port block Bi (BUSY, ACK, PE and SECT ports), and the control port block Bc (D6 and D7 ports), the data interface ports bits of the Centronics connector can be effectively shared for transferring the command signals and image data signals between the image scanner and the host computer, thus decreasing the number bits of the leads constituting the connector cable while increasing the efficiency bits of data transfer between the scanner and the computer. As the result bits of decreasing the number of the leads of the connector cable, the image scanner accompanied with the connector cable is little affected by the connector cable when being handled in scanning the image of the given document. Namely, the self-propelling type image scanner can freely move on the given document without being obstructed by the connector cable.

Although the interface ports of the Centronics connector mounted on the host computer PC are classified into the three port blocks Bo, Bi and Bc in the embodiment described above, the interface ports may be classified into four port blocks, i.e. a setting-signal output port block for outputting a control signal to the image scanner IR, an address output port block for issuing an address signal bits of the control signal, an image data input port block for receiving image data from the image scanner, and a control output port block for managing the assignment of the ports. That is to say, as a matter of course, the interface ports of the input-output connector of the computer can be diversely classified as occasion calls on the basis of the idea of the present invention to transfer the image data signal by utilization of the standard Centronics connector mounted on a common personal computer.

Figure 7:
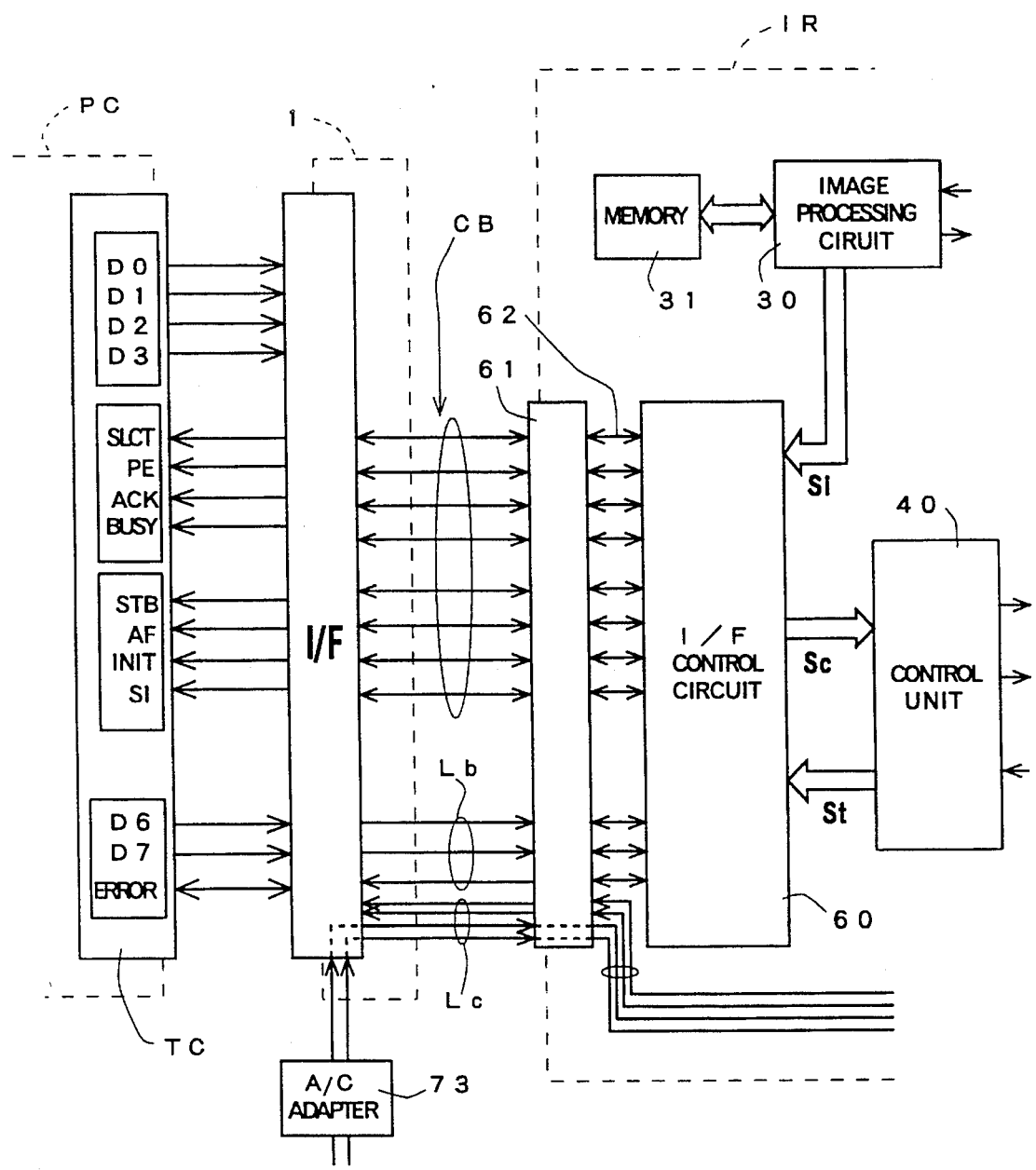
FIG. 7 is a schematic block diagram showing in part another embodiment of this invention.

FIG. 7 shows another embodiment in which four input ports of STB, INIT, AF and SI and one handshake port of ERROR of a standard 36-pin or 25-pin Centronics connector mounted on a common personal computer are used in addition to input ports of BUSY, ACK, PE and SLCT as specified above. This embodiment is applicable to a computer having the four ports of STB (STROBE), INIT, ERROR, AF and SI (SLCT IN: Select-in) serving as bidirectional transfer ports.

Since this embodiment makes it possible to transfer the image date signal Si from the image scanner IR to the computer PC and the command signal Sc from the computer PC to the image scanner IR by 8 bits in parallel, there is no necessity for splitting the signal of 8 bits into lower 4 bits and upper 4 bits. Therefore, even massive image data can be effectively transferred at a very high speed.

Figure 8:
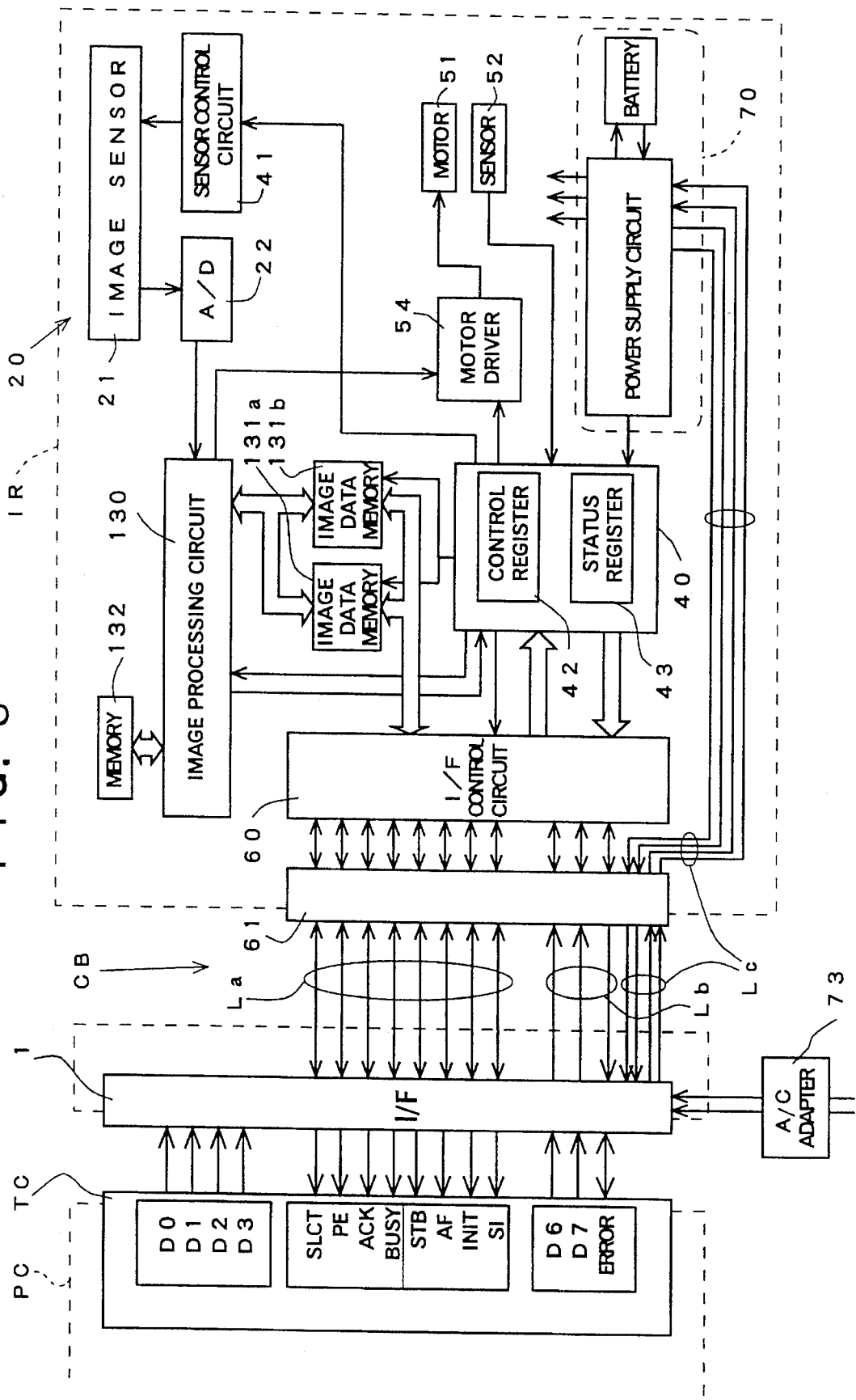
FIG. 8 is a schematic block diagram showing still another embodiment employing a different image scanner in the system of this invention.

FIG. 8 shows still another embodiment in which an image scanner of a different type. The image scanner of this embodiment is different particularly in the point that image data stored in image data memories 131a and 131b arranged in parallel can be fed to a host computer PC without passing through an image processing circuit 130, and that the image processing circuit 130 has an image processing memory 132. In this illustrated embodiment, the component elements depicted by like reference numerals or symbols with respect to those of the foregoing embodiments have analogous structures and functions to those of the foregoing embodiments will not be described in detail again.

As illustrated, the arrangement of interposing the image data memories 131a and 131b between the image processing circuit 130 and the I/F control circuit 60 enables the efficiency of data transfer to be improved.

In the image data memories 131a and 131b, only the image data processed by the image processing circuit 130 are stored. On the other hand, various image processing data for shading compensation and so on are written in the memory 132. The host computer can access the image data memories 131a and 131b, but cannot directly access the memory 132.

The system of this embodiment is provided with a motor driver 54 for driving the motor 51 in accordance with a prescribed exciting control pattern so as to permit the image scanner IR to control the operations of image reading and self-propelled document feeding by itself independent of the host computer. This system can effect alternate operations of delivering a control signal for driving the motor 51 and outputting the image data from the image scanner IR.

This system is not provided with a digital-to-analog (D/A) converter as used in the embodiment of FIG. 3 because of the distinction of a shading compensation. The shading compensation of this system is carried out in the image processing circuit 130 by a digital processing method. Although the image processing circuit 130 is somewhat different from that of the foregoing embodiment, the entire systems described herein are substantially identical in structure and function.

As described above, the image data transferring system of this invention can automatically select a transfer mode of either 4 bits or 8 bits in accordance with the number of available interface ports of the Centronics connector mounted on the host computer. The selection of the transfer mode of 4 bits or 8 bits is fulfilled by writing in order two sorts of 4-bit and 8-bit check signals from the host computer PC to one of the image data memories 131a and 131b, delivering the echo signal of the check signal to the host computer PC, and comparing the check signal with the echo signal to verify whether the 4-bit and 8-bit transfer modes are available. Of course, if both the 4-bit and 8-bit modes are available, the 8-bit mode capable of high speed data transfer takes precedence over the 4-bit mode.

The comparison of the check signal and the echo signal for deciding the number of the effective transfer ports can be carried out by a control means 80 such as a program in the host computer.

Figure 9:
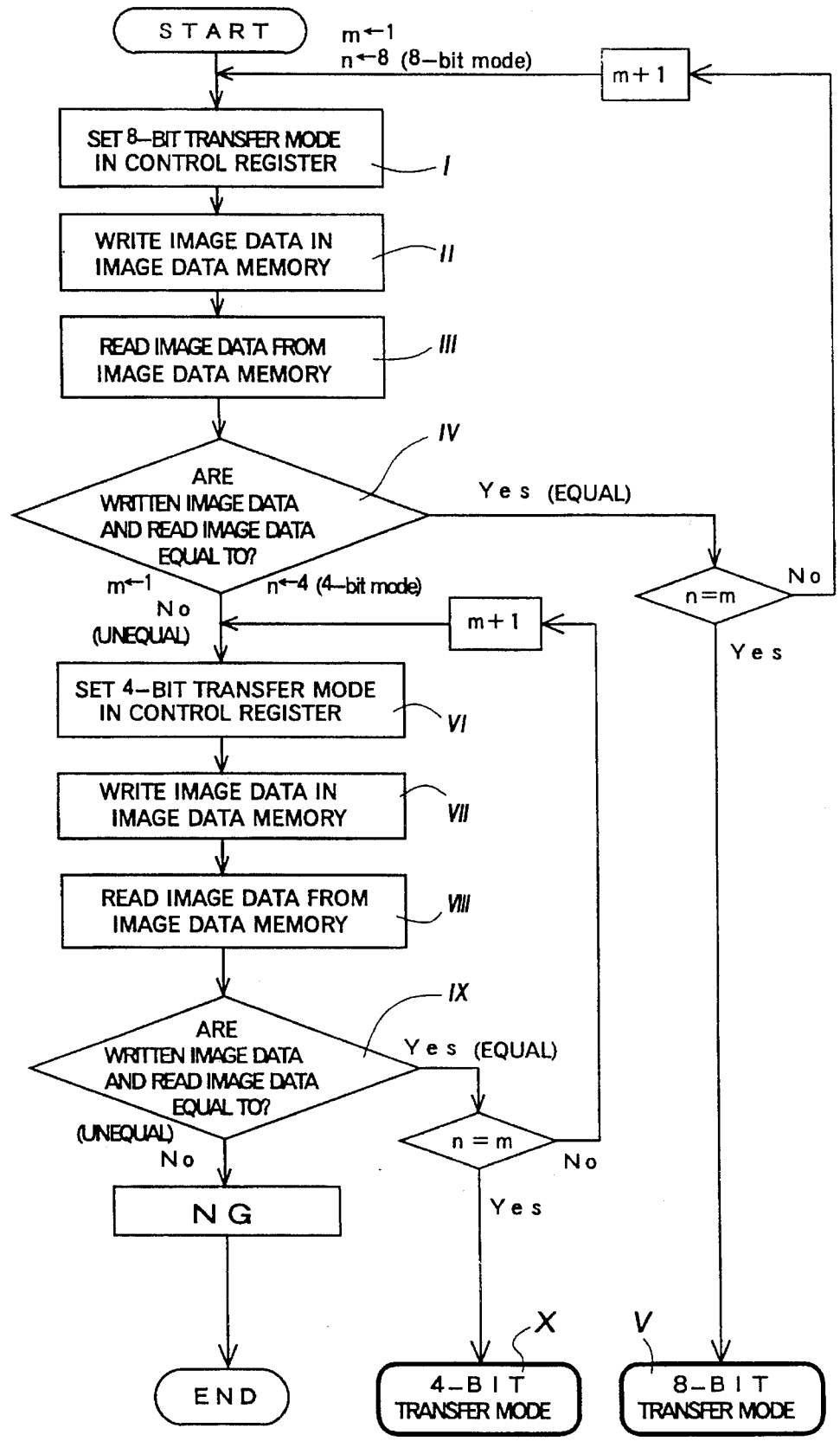
FIG. 9 is a flowchart explanatory of the operational principle of automatically selecting either 4-bit or 8-bit transfer mode in the system of this invention.

The principle of automatically designating the transfer mode of 4 bits or 8 bits will be described in detail with reference to FIG. 9. At the outset, the control register 42 is provisionally set to the 8-bit transfer mode (I). Thereafter, on the assumption that the ports of BUSY, ACK, PE, SLCT, STB, INIT, ERROR and AF are effective, the 8 bit check signal is sent in parallel from the computer PC to the image data memory (31a or 31b, 131a or 131b) through eight ports of the Centronics connector (II), and then, the check signal written in the image data memory is read out and sent back as an echo signal to the computer (III).

The check signal fed to the image data memory and the echo signal sent back to the computer are compared (IV). If these check and echo signals coincide, the eight ports of the Centronics connector can be regarded as effective. That is, when the eight ports are effective, the 8-bit check signal are sent back to the computer as they are, consequently to determine the I/F control circuit 60 of the image scanner IR to the 8-bit transfer mode (V).

Actually, the 1st to m'th of the check signal are respectively sent out bit by bit from the computer and repeated until the number "m" of the last bit of the check signal is equal to the number "n" of the transfer mode. Each time the check signal is fed to the image data memory, the check signal is compared with its echo signal sent back from the image data memory. When the check signal and echo signal do not coincide, the control register 42 is provisionally set to the 4-bit transfer mode (VI), and the 4-bit check signal is fed bit by bit in parallel out through the ports of BUSY, ACK, PE and SLCT of the Centronics connector and written in one of the image data memories (VII), in the similar manner to the checking in the 8-bit transfer mode. Then, the multiple-bit check signal written in the image data memory are read out as their echo signal (VIII), and compared with the check signal fed out (IX). When the check signal and echo signal coincide, the I/F control circuit 60 is determined to the 4-bit transfer mode (X). If the check and echo signals do not yet coincide, the transfer lines are regarded as ineffective, and consequently, data transfer becomes impossible.

By utilizing this principle, the transfer mode of 2 bits or any other possible bits can be automatically discriminated and applied to the system of the present invention.

Figure 10:
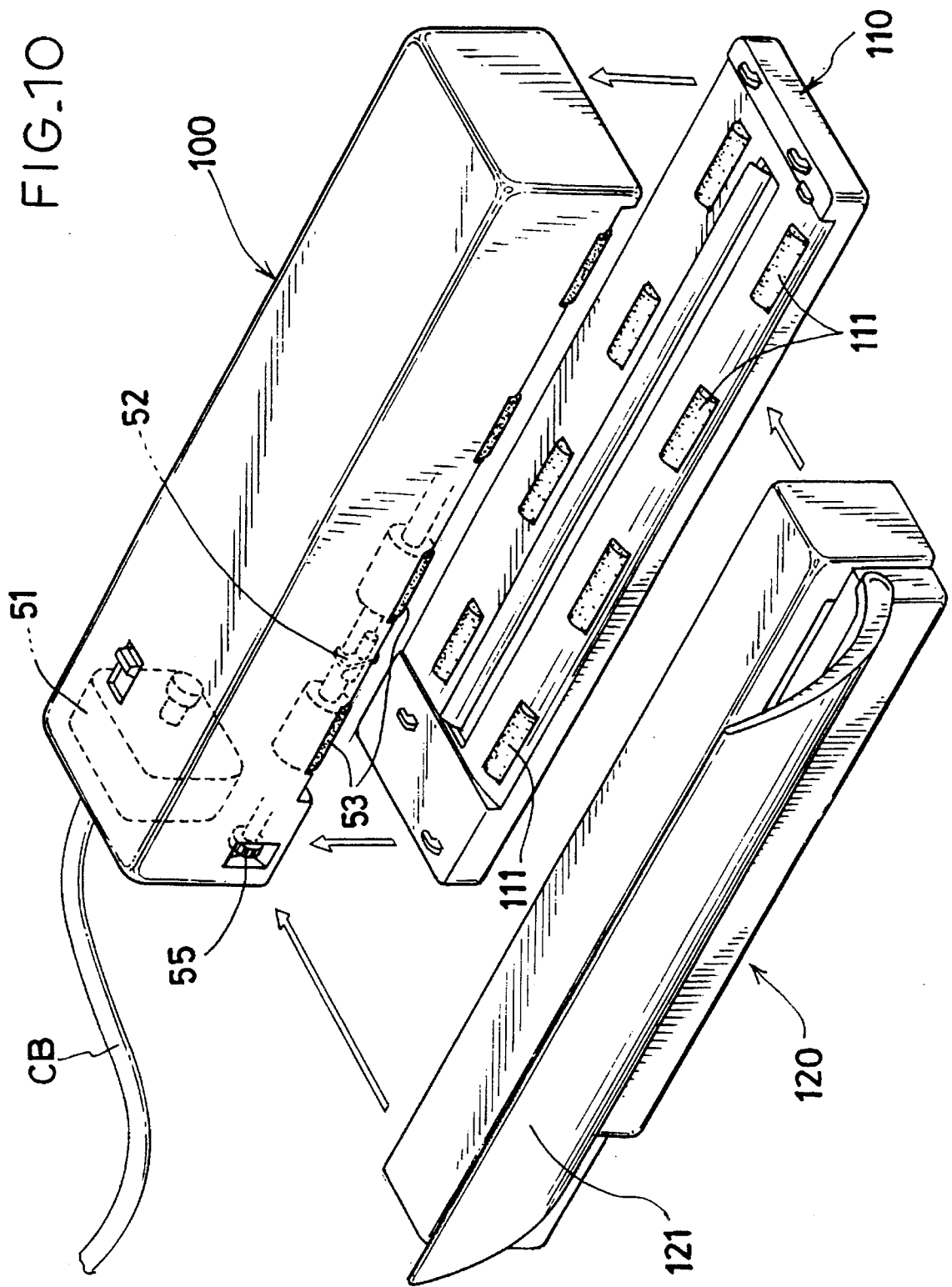
FIG. 10 is a perspective view showing one example of a portable image scanner used in the system of this invention.

Since the connector cable connecting the computer to the image scanner can be made thin according to this invention, the image data transferring system of this invention is most suitable particularly for a portable image scanner. One preferable example of the portable image scanners applicable to this invention will be explained with reference to FIG. 10 through FIG. 12.

The illustrated image scanner IR has a function of optionally selecting a "manual document supplying mode" or a "self-propelling mode". In the manual document supplying mode, an image document is manually loaded into the scanner and automatically fed while being scanned. In the self-propelling mode, the image scanner moves by itself on the surface of a thick document such as a book while scanning an image on the document.

The image scanner IR has a scanner entity 100 accommodating the image reading unit 20, the image processing circuit 30, and the control unit 40, as touched upon above. The image scanner is provided with driving rollers 53 driven by the motor 51, which partially protrudes from the bottom of the scanner entity 100, and a document sensor 52. The document sensor 52 is also disposed on the bottom of the scanner entity 100 so as to optically read the image of the document opposed to the scanner bottom. To the bottom of the scanner entity 100, there is detachably attached a cover member 110 having press rollers 111 which are brought into resilient contact with the driving rollers 53 of the scanner entity 100.

When the scanner entity 100 and the cover member 110 are united, there is formed a document passage P through which a cut-sheet document is forwarded by the driving rollers 53 while scanning the image on the document by the image sensor 21, thus delivering the image data signal for reproducing the image by the computer PC. Namely, when the cut-sheet is manually inserted into the document passage P, the document sensor 52 is operated to start rotating the driving rollers 53, thus forwarding the document along the document passage P, as illustrated in FIG. 11.

Figure 12:
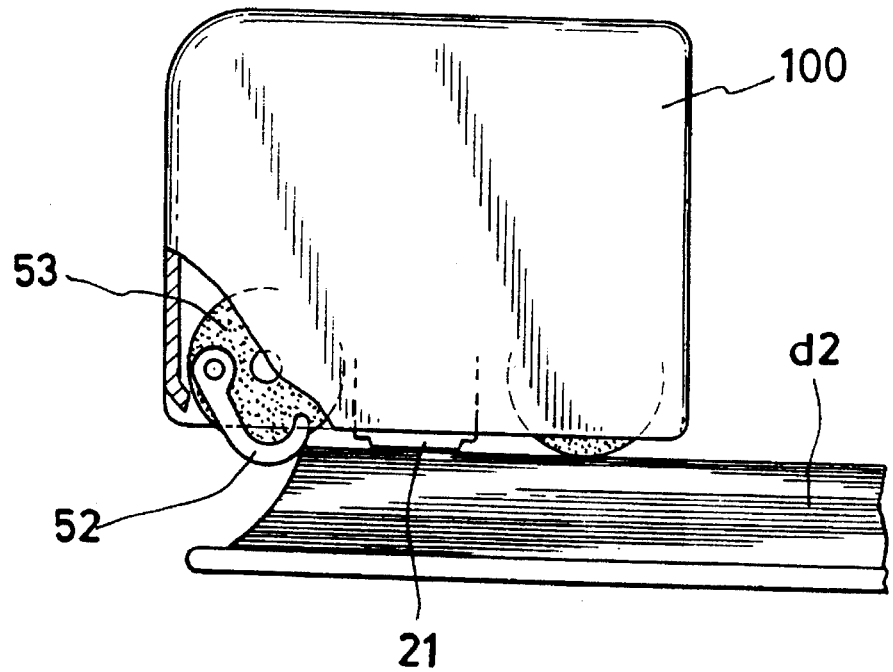
FIG. 12 is a partial cutaway side view of the image scanner in use of FIG. 10, in a self-propelling mode.

By detaching the cover member 110 from the scanner entity 100, the scanner entity 100 alone can be used in such a manner that it is placed on a thick document such as a book and moved across the surface of the document by actuating the driving rollers 53 while scanning the image on the document by the image sensor 21 as shown in FIG. 12. When the scanner entity 100 self-propelled on the document reaches the edge of the document, the document sensor 52 comes down to deactivate the driving rollers 53 to stop the scanner entity 100 and document reading operation, as illustrated.

Figure 11:
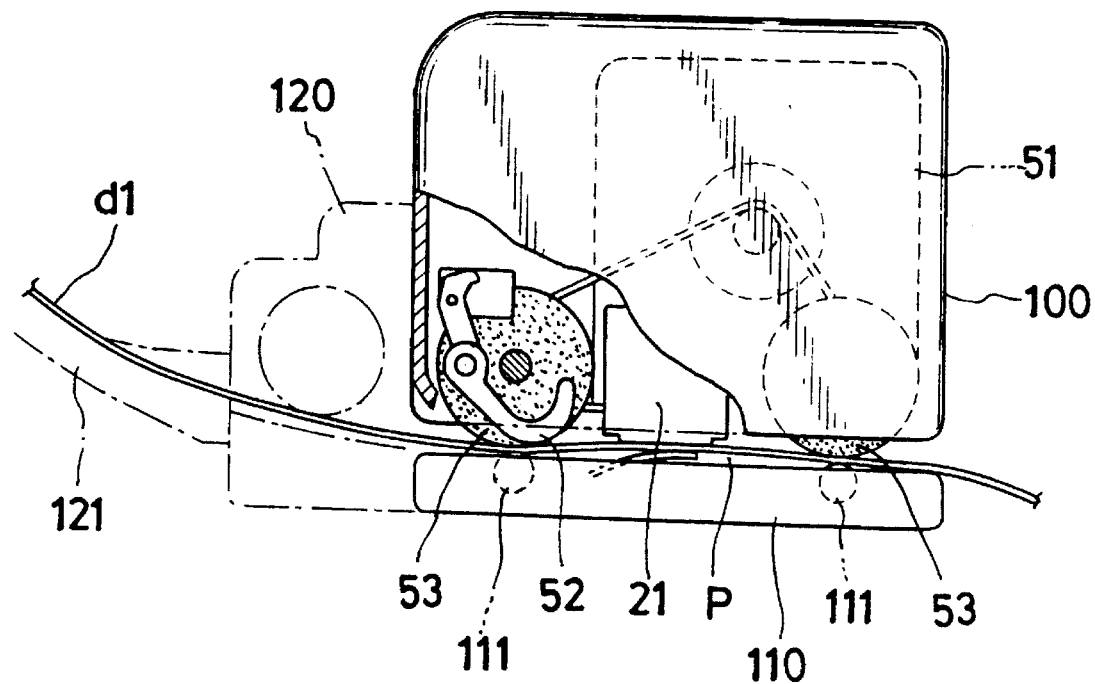
FIG. 11 is a partial cutaway side view of the image scanner of FIG. 10, in a manual document supplying mode.

In the drawings, reference numeral 120 denotes an automatic document feeder which is detachably attached to the united scanner entity 100 and cover member 110 as indicated by the imaginary line in FIG. 11. The document feeder 120 is operated by the rotation transmitted from the motor 51 through the medium of a gear 55 disposed on the scanner entity 100, thus continuously feeding the cut-sheet documents loaded on the feeder 120 one by one through the document passage P defined between the scanner entity 100 and cover member 110.

According to the system of this invention, since the connector cable CB connecting the computer PC and the image scanner IR can be made thin and flexible, the scanner entity 100 separate from the cover member 110 is little encumbered with the connector cable even when moving by itself across the document, and therefore, enables precise image reading.

As is apparent from the foregoing description, according to the present invention, image data signals read from the image scanner and stored in the image data memories can be rationally transferred at a high speed through a standard Centronics interface without a specific exclusive or dedicated interface. Besides, since the number of available ports for transferring the image data can be automatically recognized, the system of the invention can be suitably applied to various interface boards of different types. That is, by classifying the input and output ports commonly used for printing data into the setting-signal output port block D0–D3), image data input port block (BUSY, PE, ACK and SLCT) and control port block (D6, D7), the control or command signal fed from the computer to the image scanner and the image data signal fed from the image scanner to the computer can share the input and output connector of the computer, thereby decreasing the number of leads of the connector cable while increasing the efficiency of data transfer between the scanner and the computer.

It is to be understood that the invention is not limited in its application to the details of construction and arrangement of parts illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A system for interfacing an image processor having a signal input-output connector with signal input and output ports and an image scanner for scanning a given image to transfer a multiple-bit image data signal issued from said image scanner and a command signal outputted from said image processor between said image processor and image scanner, comprising signal transfer lines for transferring said command signal from said image processor to said image scanner and said image data signal from said image scanner to said image processor bit by bit in parallel, an interface unit including switching means for selecting either said signal input ports of said image processor when transferring said image data signal from said image scanner to said image processor or said signal output ports when transferring said command signal from said image processor to said image scanner, a control unit having a status register capable of memorizing a status signal representing conditions of said image scanner and successively feeding said status signal to said image processor, and an interface control circuit for designation of a transfer mode in which said image data signal of specific bits is permitted to be transferred bit by bit in parallel and switching said switching means in accordance with the designated transfer mode, said transfer mode designation in said interface control circuit being effected by giving a check signal of specific bits from said image processor to said status register, sending back an echo signal read out from said status register, and comparing said check signal with said echo signal to determine whether said check signal and said echo signal coincide, and said signal transfer lines being shared by said image processor and said image scanner to transfer said image data and command signals when said check signal and said echo signal coincide.

2. A system for interfacing an image processor having signal input and output ports and an image scanner to transfer a multiple-bit image data signal issued from said image scanner and a command signal outputted from said image processor, comprising:

signal transfer lines for transferring said command signal from said image processor to said image scanner and said image data signal from said image scanner to said image processor bit by bit in parallel, an interface unit including switching means for selecting either said signal input ports of said image processor when transferring said image data signal from said image scanner to said image processor, or said signal output ports when transferring said command signal from said image processor to said image scanner, and a control unit for discriminating said signal transfer lines in bit number to permit said image data and control signals to be transferred therethrough, said signal transfer lines being shared by giving a check signal of specific bits from said image processor to said control unit, sending back an echo signal read out from said control unit, and comparing said check signal with said echo signal to determine whether said check signal and said echo signal coincide, thereby designating a transfer mode in which said image data signal of specific bits is permitted to be transferred bit by bit in parallel and switching said switching means in accordance with the designated transfer mode.

3. A system for transferring a multiple-bit image data signal obtained by scanning a given image document to an image processor having signal input and output ports, comprising:

an image scanner having an image sensor for reading said image document and issuing said image data signal, and one or more image memories for storing said image data signal from said image sensor, and an interface unit for connecting said image scanner and said image processor through signal transfer lines, said signal transfer lines being shared by giving a check signal of specific bits from said image processor to said memory in said image scanner, sending back an echo signal read out from said memory, and comparing said check signal with said echo signal to determine whether said check signal and said echo signal coincide, thereby designating a transfer mode in which said image data signal of specific bits are permitted to be transferred bit by bit in parallel and switching said switching means in accordance with the designated transfer mode.

4. A method for interfacing an image processor having signal input and output ports and an image scanner to transfer a multiple-bit image data signal issued from said image scanner and control and command signals outputted from said image processor between said image scanner and image processor, which comprises:

issuing a check signal from said image processor to select a transfer mode for designating effective transfer ports to permit said image data signal and said control and command signals to be transferred between said image processor and said image scanner, and selecting said designated effective transfer ports in accordance with said transfer mode, to share said signal transfer lines being shared by said image processor and said image scanner to transfer said image data, control and command signals.

5. A method for interfacing an image processor having signal input and output ports and an image scanner to transfer a multiple-bit image data signal issued from said image scanner and control and command signals outputted from said image processor between said image scanner and image processor, which comprises:

giving a check signal of specific bits from said image processor to said image scanner, sending back an echo signal read out from said image scanner to said image processor, comparing said check signal with said echo signal to determine whether said check signal and said echo signal coincide, to select a transfer mode of permitting said image data signal of specific bits to be transferred bit by bit in parallel, and designating effective transfer ports in accordance with said selected transfer mode to permit said image data signal and said control and command signals to be transferred between said image processor and said image scanner, thereby to share said signal transfer lines being shared by said image processor and said image scanner to transfer said image data, control and command signals between said image scanner and said image processor.

6. A method according to claim 5, wherein said check signal is repeatedly given to said image scanner and, each time it returns as the echo signal, it is compared with the echo signal.

7. A method according to claim 5, wherein the check signal of 8 bits is first given to said image scanner, and when said check signal and echo signal do not coincide, the check signal of 4 bits is successively given to said image scanner.

8. A system for interfacing an image processor having a signal input-output connector and an image scanner for scanning a given image to transfer a multiple-bit image data signal issued from said image scanner and control and command signals outputted from said image processor, said signal input-output connector having signal input and output ports classified into setting-signal output port block for transferring said control or command signal from said image processor to said image scanner, image data input port block for transferring said image data signal from said image scanner to said image processor, and control port block for transferring said control or command signal from said image processor to said image scanner, which comprises:

(a) signal transfer lines for transferring said control, command and image data signals bit by bit in parallel, (b) an interface unit including switching means for selecting either said signal input ports of said image processor when transferring said image data signal from said image scanner to said image processor, or said signal output ports when transferring said control or command signal from said image processor to said image scanner, (c) a control unit having a status register for storing a status signal representative of conditions of said image scanner, and successively feeding said status signal to said image processor, and (d) an interface control circuit for designation of a transfer mode in which said image data signal of specific bits is permitted to be transferred bit by bit in parallel and switching said switching means in accordance with the designated transfer mode, said transfer mode designation in said interface control circuit being affected by permitting a check signal of specific bits to be fed from said image processor to said status register, and sent back as an echo signal from said status register so as to compare said check signal with said echo signal to determine whether said check signal and said echo signal coincide, and said signal transfer lines being shared by said image processor and said image scanner to transfer said image data and command signal signals when said check signal and said echo coincide.

9. A system for interfacing an image processor having a signal input-output connector with signal input and output ports and an image scanner for scanning a given image to transfer a multiple-bit image data signal issued from said image scanner and control and command signals outputted from said image processor, comprising:

signal transfer lines for transferring said control, command and image data signals bit by bit in parallel, said signal input and output ports being classified into a setting-signal output port block for transferring said control or command signal from said image processor to said image scanner, an image data input port block for transferring said image data signal from said image scanner to said image processor, a control port block for transferring said control or command signal from said image processor to said image scanner, and an address Output port block for issuing an address signal of said control or command signal, an interface unit including switching means for selecting either said signal input ports of said image processor when transferring said image data signal from said image scanner to said image processor, or said signal Output ports when transferring said control or command signal from said image processor to said image scanner, said signal transfer lines being shared by said image processor and said image scanner to transfer said image data and command signals; and an interface control circuit for designation of a transfer mode in which said image data signal of specific bits is permitted to be transferred bit by bit in parallel and switching said switching means in accordance with the designated transfer mode, said transfer mode designation in said interface control circuit being affected by permitting a check signal of specific bits to be fed from said image processor to said status register, and sent back as an echo signal from said status register so as to compare said check signal with said echo signal to determine whether said check signal and said echo signal coincide, and said signal transfer lines being shared by said image processor and said image scanner to transfer said image data and command signal signals when said check signal and said echo coincide.

10. A system for transferring a multiple-bit image data signal obtained by scanning a given image document to an image processor having signal input and output ports, comprising:

an image scanner having an image sensor for reading said image document and issuing said image data signal, one or more image memories for storing said image data signal from said image sensor, and a driving unit for moving said image scanner relative to said image document, an interface unit for connecting said image scanner and said image processor through signal transfer lines, a control unit for transferring a control signal for controlling said driving unit and a command signal from said image processor to said image scanner through said signal output ports, and said image data signal from said image scanner to said image processor through said signal input ports, said control signal fed from said image processor to said image scanner for controlling said driving unit and said image data signal from said image scanner being alternately transferred between said image processor and said image scanner through said signal transfer lines, and an interface control circuit for designation of a transfer mode in which said image data signal of specific bits is permitted to be transferred bit by bit in parallel and switching said switching means in accordance with the designated transfer mode, said transfer mode designation in said interface control circuit being affected by permitting a check signal of specific bits to be fed from said image processor to said status register, and sent back as an echo signal from said status register so as to compare said check signal with said echo signal to determine whether said check signal and said echo signal coincide, and said signal transfer lines being shared by said image processor and said image scanner to transfer said image data and command signal signals when said check signal and said echo coincide.

11. A system according to claim 10, wherein said driving unit is provided with driving rollers which rotate while coming into contact with the image document in scanning the image document by said image sensor.

12. A system for transferring a multiple-bit image data signal obtained by scanning a given image document to an image processor having signal input and output ports, comprising:

an image scanner having an image sensor for reading said image document and issuing said image data signal, one or more image memories for storing said image data signal from said image sensor, and a driving unit for moving said image scanner relative to said image document, an interface unit for connecting said image scanner and said image processor through signal transfer lines, a control unit for transferring a control signal for controlling said driving unit and a command signal from said image processor to said image scanner through said signal output ports and said image data signal from said image scanner to said image processor through said signal input ports, said signal input and output ports being classified into a setting-signal output port block for transferring said command signal from said image processor to said image scanner, an image data input port block for transferring said image data signal from said image scanner to said image processor, and a control port block for transferring said control signal from said image processor to said image scanner, and an interface unit including switching means for selecting either said signal input ports of said image processor when transferring said image data signal from said image scanner to said image processor or said signal output ports when transferring said control or command signal from said image processor to said image scanner, said control signal fed from said image processor to said image scanner for controlling said driving unit and said image data signal from said image scanner being alternately transferred between said image processor and said image scanner through said signal transfer lines, and an interface control circuit for designation of a transfer mode in which said image data signal of specific bits is permitted to be transferred bit by bit in parallel and switching said switching means in accordance with the designated transfer mode, said transfer mode designation in said interface control circuit being affected by permitting a check signal of specific bits to be fed from said image processor to said status register, and sent back as an echo signal from said status register so as to compare said check signal with said echo signal to determine whether said check signal and said echo signal coincide, and said signal transfer lines being shared by said image processor and said image scanner to transfer said image data and command signal signals when said check signal and said echo coincide.

13. A system for transferring a multiple-bit image data signal obtained by scanning a given image document to an image processor having signal input and output ports, comprising:

an image scanner having an image sensor for reading said image document and issuing said image data signal, one or more image memories for storing said image data signal from said image sensor, and a driving unit for moving said image scanner relative to said image document, an interface unit for connecting said image scanner and said image processor through signal transfer lines, a control unit for transferring a control signal for controlling said driving unit and a command signal from said image processor to said image scanner through said signal output ports and said image data signal from said image scanner to said image processor through said signal input ports, a control unit for driving said driving unit in accordance with said control signal from said image processor so as to move said image scanner across said image document by said driving unit in scanning said image document, and an interface control circuit for designation of a transfer mode in which said image data signal of specific bits is permitted to be transferred bit by bit in parallel and switching said switching means in accordance with the designated transfer mode, said transfer mode designation in said interface control circuit being affected by permitting a check signal of specific bits to be fed from said image processor to said status register, and sent back as an echo signal from said status register so as to compare said check signal with said echo signal to determine whether said check signal and said echo signal coincide, and said signal transfer lines being shared by said image processor and said image scanner to transfer said image data and command signal signals when said check signal and said echo coincide.

\* \* \* \* \*